(12) United States Patent
Iraschko

(10) Patent No.: US 8,348,026 B2
(45) Date of Patent: Jan. 8, 2013

(54) BRAKE CYLINDER FOR COMPRESSED AIR OPERATED VEHICLE DISC BRAKES

(75) Inventor: Johann Iraschko, Schweitenkirchen (DE)

(73) Assignee: Knorr-Bremse Systeme fuer Nutzfahrzeuge GmbH, Munich (GB)

( * ) Notice: Subject to any disclaimer, the term of this patent is extended or adjusted under 35 U.S.C. 154(b) by 337 days.

(21) Appl. No.: 12/853,646

(22) Filed: Aug. 10, 2010

(65) Prior Publication Data

US 2010/0320039 A1    Dec. 23, 2010

Related U.S. Application Data

(63) Continuation of application No. PCT/EP2009/000803, filed on Feb. 5, 2009.

(30) Foreign Application Priority Data

Feb. 22, 2008   (DE) .................. 10 2008 010 569

(51) Int. Cl.
    *F16D 65/24* (2006.01)
(52) U.S. Cl. .................. 188/170; 92/63; 188/265
(58) Field of Classification Search .............. 188/153 D, 188/153 R, 170, 265; 92/29, 63, 130 A; 303/89
    See application file for complete search history.

(56) References Cited

U.S. PATENT DOCUMENTS

| 3,260,168 | A |   | 7/1966  | Cruse |
| 3,282,169 | A |   | 11/1966 | Leighton |
| 3,636,822 | A | * | 1/1972  | Horowitz .......................... 92/63 |
| 3,994,206 | A | * | 11/1976 | Dahlkvist et al. ................. 92/29 |
| 4,364,305 | A |   | 12/1982 | Dalibout et al. |
| 5,038,896 | A | * | 8/1991  | Wirth .......................... 188/153 R |
| 2006/0131116 | A1 |   | 6/2006  | Plantan et al. |
| 2007/0246313 | A1 | * | 10/2007 | Iraschko ....................... 188/170 |

OTHER PUBLICATIONS

German Office Action dated Oct. 15, 2008 with English translation (six (6) pages).
International Search Report dated Feb. 9, 2010 with English translation (four (4) pages).

* cited by examiner

*Primary Examiner* — Christopher Schwartz
(74) *Attorney, Agent, or Firm* — Crowell & Moring LLP

(57) ABSTRACT

A brake cylinder is provided for vehicle brakes, in particular for commercial vehicles brakes, that is equipped with a brake cylinder housing, in which a spring-loaded piston, a service brake piston, a spring-loaded spring and a piston return spring are arranged. The brake cylinder is simple to construct and extremely compact. The spring-loaded piston is in a primary chamber of the brake cylinder and is arranged between the service brake piston and a front side of the brake cylinder housing having the compressed air connections.

16 Claims, 1 Drawing Sheet

BRAKE CYLINDER FOR COMPRESSED AIR OPERATED VEHICLE DISC BRAKES

CROSS-REFERENCE TO RELATED APPLICATIONS

This application is a continuation of PCT International Application No. PCT/EP2009/000803, filed Feb. 5, 2009, which claims priority under 35 U.S.C. §119 from German Patent Application No. DE 10 2008 010 569.4, filed Feb. 22, 2008, the entire disclosures of which are herein expressly incorporated by reference.

BACKGROUND AND SUMMARY OF THE INVENTION

The invention relates to a brake cylinder for compressed air operated vehicle brakes, in particular for brakes of commercial vehicles.

In order to generate the large braking forces required, commercial vehicles are equipped with compressed air operated brakes. The "service brake" is operated in this case with compressed air cylinders, preferably in the form of diaphragm cylinders. By contrast, the parking brake cannot be operated with a compressed air cylinder, since the parking brakes may only act mechanically, as only in this way can a constant braking force be ensured for a virtually unlimited period of time. If parking brakes are charged with compressed air, the braking force could drop because of leakages.

For this reason, the brakes of commercial vehicles are equipped with "spring force accumulator cylinders". The brake operating force is generated in this case via a stressed spring. This therefore satisfies the requirement of a mechanically acting parking brake. Since spring force accumulator cylinders generally provide very high forces, it is no longer possible for the brake to be released manually. Various solutions are provided in this respect. For example, the spring force accumulator cylinder is equipped with a release piston. It is possible with this piston, upon introduction of compressed air, to compress the spring to an extent such that the brake is released. Furthermore, it is also possible to release the parking brake by use of a spindle which is operated from the outside.

The parking brake is required only on one axle of a vehicle, this is the rear axle as a rule. Since installation space is limited, the brakes together with a parking brake are equipped with "combined cylinders". A cylinder of this type consists in practice of two different types of cylinder, namely a spring force accumulator cylinder for the parking brake and a compressed air cylinder, preferably a diaphragm cylinder, for the service brake.

Nevertheless, a relatively large installation space is required even for this design. The commercial vehicles are frequently equipped with complicated chassis systems, such as, for example, individual wheel suspensions, lightweight axles and the like, as a result of which the installation space is limited.

In the manufacturing of commercial vehicles, it is therefore endeavored to find designs and ways of operation in order to minimize the installation spaces for the parking brake cylinder.

A "compact combined cylinder" has therefore been proposed, in which the function of the parking brake cylinder is integrated into the service brake cylinder. In this case, the spring force accumulator spring is no longer operated via a separate spring force accumulator piston but via the piston of the service brake cylinder. In order to release the parking brake, the service brake piston is charged by means of compressed air for a short period of time, but a special actuating means is required in this case.

The invention is based on the object of designing a brake cylinder for vehicle brakes of the type described above such that the required installation space for a vehicle brake of this type is minimized in a structurally simple manner.

The object set is achieved in that the spring force accumulator piston is arranged in the primary space which is to be pressurized for service brake operations. The brake cylinder according to the invention can therefore be considered to be extremely compact. In addition, the service brake piston is no longer loaded by the weight of the spring force accumulator spring.

The spring force accumulator piston and the service brake piston operate independently of each other such that the spring force accumulator spring can be released, for example, by a release spindle accessible from outside the brake cylinder.

Furthermore, another advantage is that the stressing of the service brake piston and of the service brake piston guide when subjected to a load, for example due to shaking, is reduced.

In a preferred refinement, the piston-resetting spring is arranged on that side of the service brake piston which faces away from the spring force accumulator.

In the release position of the brake, the spring force accumulator piston is at a small distance from the end wall having the compressed air connections. This distance is produced by the compressed spring force accumulator spring. In addition, the service brake piston bears against the spring force accumulator piston or is at a small distance therefrom.

If a braking operation is triggered, the service brake piston moves toward the opposite end wall, i.e. the distance between the spring force accumulator piston and the service brake piston is increased. If, however, the parking brake is operated, the pressure in the pressure space of the brake cylinder is reduced or completely dissipated such that the spring force accumulator spring can relax and set the brake. In this position, the spring force accumulator piston and the service brake piston again bear against each other. This way of operating the spring force accumulator piston and the service brake piston results in the compact design.

The spring force accumulator piston may differ in design. In a first embodiment, the annular flange of the spring force accumulator piston corresponds to the inside diameter of the brake cylinder housing. This simultaneously creates a guide by way of the wall of the brake cylinder housing. The service brake piston is charged either by a flexible compressed air line or by a centrally arranged ventilation pipe.

In order to pressurize the spring force accumulator piston, the circumferential surface of the annular flange thereof has an encircling seal. As a result, air cannot escape when the spring force accumulator piston is pressurized.

In a second embodiment, the outside diameter of the annular flange of the spring force accumulator piston is smaller than the inside diameter of the brake cylinder housing. When the parking brake is actuated, the spring force accumulator piston moves to the side opposite the compressed air connections and, in the process, carries along the service brake piston therewith. That region of the brake cylinder which is remote from the spring force accumulator piston is then vented. The ratio of the outside diameter of the annular flange of the spring force accumulator piston to the inside diameter of the brake cylinder housing is in the range of two to three.

Preferably, furthermore, that surface of the service brake piston which faces the spring force accumulator piston is of a stepped design. In this case, an outer annular surface protrudes in relation to the central surface.

Preferably, at least one seal, but more preferably two seals which are also separated from each other by a web, is or are inserted into the circumferential surface of the service brake piston.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
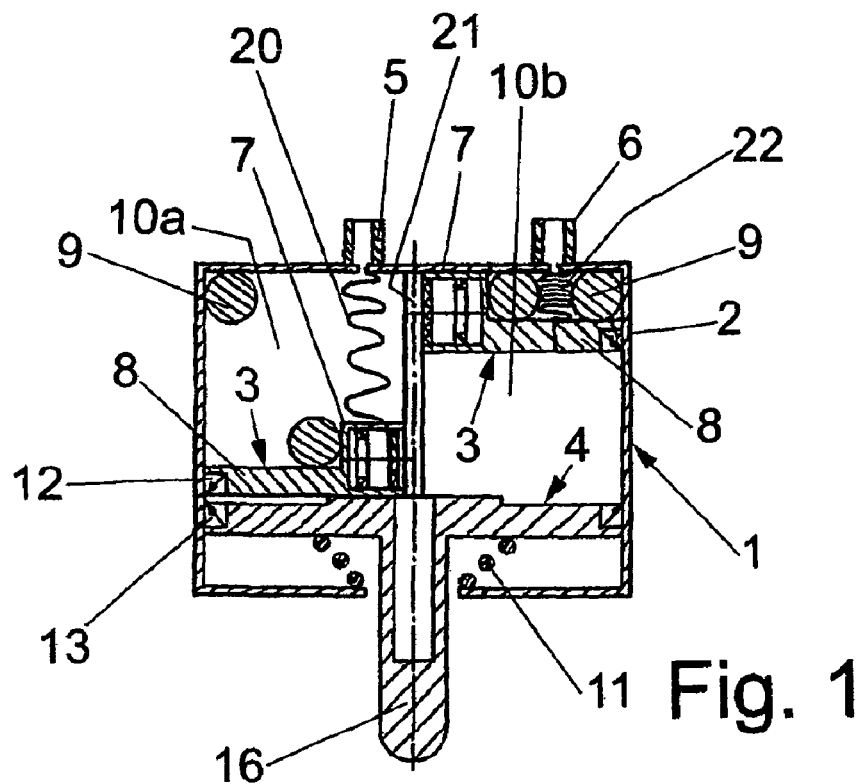
FIG. 1 is a sectional illustration of a first embodiment of the brake cylinder according to the invention.
Figure 2:
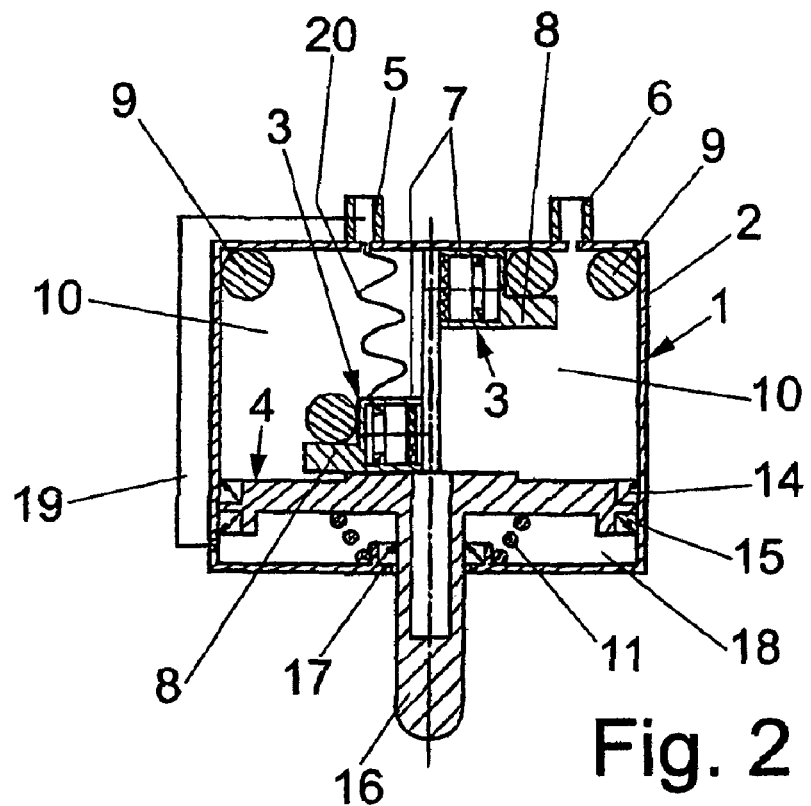
FIG. 2 is a sectional illustration of a second embodiment of the brake cylinder according to the invention.

The brake cylinder 1 illustrated in FIGS. 1 and 2 has a cup-shaped brake cylinder housing 2 in which a spring force accumulator piston 3 and a service brake piston 4 are each displaceably guided.

The service brake piston 4 divides the interior of the brake cylinder housing 2 into a primary space 10 and a secondary space 18. The spring force accumulator piston 3 is arranged in the primary space 10 and, in FIG. 1, divides the primary space 10 in turn into a first partial space 10a and a second partial space 10b between the spring force accumulator piston 3 and the service brake piston 4.

The service brake piston 4 is provided with a piston rod 16, which projects out of the brake cylinder housing 2.

The illustrations according to FIGS. 1 and 2 show that two compressed air connections 5, 6 are formed on that side of the brake cylinder housing 2 which faces away from the operating plunger (piston rod) 16.

The one compressed air connection 5 is connected to a locking device 7 via a pneumatic line 20 and serves to pneumatically operate (release and lock) the locking device 7 (indicated purely schematically), which is designed to lock the spring force accumulator piston 3 in an axial position on a rod or spindle 21 passing therethrough (or to release said locking).

By contrast, the other compressed air connection 6 serves to initiate service brake operations and to move the parking brake piston back after parking brake operations. The compressed air connection 6 is connected via a further pneumatic line 22 to the second partial space 10b of the primary space 10.

A spring force accumulator spring 9, which is preferably of conical design and is arranged in the first partial space 10a between the spring force accumulator piston 3 and the wall with the compressed air connections 5, 6 of the brake cylinder housing, acts on the spring force accumulator piston 3.

The service brake piston 4 is located on that side of the spring force accumulator piston 3 which faces away from the compressed air connections 5, 6.

A piston-resetting spring 11, which moves the service brake piston 4 into an upper end position (not illustrated) after service brake operations, acts on that surface of the service brake piston 4 which faces away from the spring force accumulator piston 3.

In the embodiment according to FIG. 1, the outside diameter of the annular flange 8 of the spring force accumulator piston 3 is matched to the inside diameter of the brake cylinder housing 2. A seal 12 is inserted into an outer circumferential groove. In the embodiment according to FIG. 1, a further seal 13 is inserted into an outer circumferential groove of the service brake piston 4.

In FIGS. 1 and 2, in the right-hand illustration, the spring force accumulator piston 3 is illustrated in the release position of the vehicle brake while, in the left-hand illustration, the parking brake is activated.

To initiate a service brake operation, the partial space 10b between the service brake piston 4 and the parking brake piston 3 is charged with compressed air via the compressed air connection 6 such that the service brake piston moves and the plunger 16 is moved out of the brake cylinder housing 2. The parking brake piston 3 remains in the initial position (right side of FIG. 1).

As a result, the service brake piston 4 is not loaded by the weight of the spring force accumulator spring 9. The locking mechanism can be arranged on the spring force accumulator piston 4, in the manner of FIG. 1, and on the cylinder housing 2.

In order to release the service brake operation, the pressure is reduced in the partial space 10b or said partial space 10b is vented such that the piston-resetting spring 11 moves the service brake piston 4 back into the initial position (not illustrated here).

In a parking brake operation, the locking mechanism 7 for the spring force accumulator piston 3 is released via the compressed air connection 5 such that the spring force accumulator spring 9 can relax and can thereby move the spring force accumulator piston 3 (if appropriate together with the service brake piston 4), as a result of which the plunger 16 is again extended and acts on a brake application device of a disc brake or drum brake.

In order to release the parking brake operation, the partial space 10b between the spring force accumulator piston 4 and the parking brake piston 3 is charged with compressed air, as a result of which the parking brake piston 4 is moved from the position on the left in FIG. 1 away from the service brake piston 3 into the position on the right in FIG. 1. The parking brake can therefore be released in a simple manner.

The selected arrangement of the spring force accumulator piston affords numerous advantages.

The spring force accumulator spring 9 is therefore in a protected and sealed space, the primary space 10, and is therefore securely protected from corrosion.

The spring force accumulator spring 9 is actuated by a dedicated spring force accumulator piston 3, which is independent of the service brake piston 4.

In this case, the spring force accumulator spring 9 can be released manually in a simple manner by means of a release spindle which is accessible from the outside (not illustrated in detail here).

Since the service brake piston 4 is furthermore not loaded by the weight of the accumulator spring 9, the stressing of the service brake piston 4 and of the piston guide during loads caused by shaking is reduced.

The embodiment of the brake cylinder 1 according to FIG. 2 differs from the embodiment according to FIG. 1 first of all in that the annular flange 8 has an outside diameter which is smaller than the inside diameter of the brake cylinder housing 2. In this case, the diameter ratio of the outside diameter of the annular flange 8 to the inside diameter of the brake cylinder housing 2 is around approx. two to three. Therefore, the primary space 10 is not divided into two partial spaces. In this case, the compressed air connection 6 opens directly into the primary space 10.

In the embodiment according to FIG. 2, two seals 14, 15 which are separated from each other by a web are therefore furthermore inserted into the circumferential surface of the service brake piston 4.

The service brake piston 4 can be charged here with compressed air on both sides—also from the side of the secondary space 18 which faces away from the primary space 10, for which purpose a pneumatic line 19 opens into the secondary space 18 from the compressed air connection 5. A further pneumatic line 20 connects the compressed air connection in turn to the locking device 7. The secondary space 18 is sealed off from the surroundings by a seal 17 on the piston rod 16 and can therefore be pressurized.

A service brake operation is initiated, as described with respect to FIG. 1, by ventilation of the primary space.

In order to apply the spring force accumulator brake, the locking mechanism 7 for the spring force accumulator piston is released now or even without a previous service brake operation such that the spring force accumulator spring can relax.

For the release operation, the secondary space 18 is ventilated and the primary space vented such that the service brake piston 4 is moved back together with the parking brake piston 3 into the initial position. In the process, the spring force accumulator spring 9 is compressed.

In addition to the advantages discussed in FIG. 1, this embodiment affords the advantage that the service brake piston 4 can be ventilated directly without a pneumatic line or compressed air line into the primary space 10. In addition, during release of the spring force accumulator brake, a force is not exerted on the brake, and therefore release is possible while underway. Given an appropriate actuation, an increasing and decreasing amount of spring force can be metered in.

TABLE OF REFERENCE NUMERALS

Brake cylinder 1
Brake cylinder housing 2
Spring force accumulator piston 3
Service brake piston 4
Compressed air connection 5
Compressed air connection 6
Locking mechanism 7
Annular flange 8
Primary space 10
First partial space 10*a*
Second partial space 10*b*
Piston-resetting spring 11
Seal 12
Seal 13
Seals 14, 15
Plunger (piston rod) 16
Seal 17
Secondary space 18
Pneumatic line 19
Pneumatic line 20
Rod 21
Pneumatic line 22

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A brake cylinder for a compressed air operated vehicle brake, comprising:
    a brake cylinder housing provided with compressed air connections;
    a service brake piston guided movably within the brake cylinder housing, the service brake piston dividing the brake cylinder into a primary space and a secondary space;
    a spring force accumulator piston guided movably within the brake cylinder housing;
    a spring force accumulator spring configured for loading the spring force accumulator piston;
    wherein the spring force accumulator piston is lockable in a release position of the vehicle brake; and
    wherein the spring force accumulator piston is arranged in the primary space, which is pressurizeable for service brake operations.

2. The brake cylinder according to claim 1, wherein an annular flange of the spring force accumulator piston corresponds to an inner diameter of the brake cylinder housing.

3. The brake cylinder according to claim 2, wherein a circumferential surface of the annular flange has an encircling seal.

4. The brake cylinder according to claim 3, wherein an outer diameter of the annular flange is smaller than the inner diameter of the brake cylinder housing.

5. The brake cylinder according to claim 3, further comprising a seal operatively arranged in a circumferential surface of the service brake piston.

6. The brake cylinder according to claim 3, further comprising at least two seals spaced apart from one another, the two seals being operatively arranged in a circumferential surface of the service brake piston.

7. The brake cylinder according to claim 2, wherein an outer diameter of the annular flange is smaller than the inner diameter of the brake cylinder housing.

8. The brake cylinder according to claim 1, wherein the spring force accumulator piston divides the primary space into two partial sp aces.

9. The brake cylinder according to claim 8, wherein an annular flange of the spring force accumulator piston corresponds to an inner diameter of the brake cylinder housing.

10. The brake cylinder according to claim 9, wherein a circumferential surface of the annular flange has an encircling seal.

11. The brake cylinder according to claim 10, wherein an outer diameter of the annular flange is smaller than the inner diameter of the brake cylinder housing.

12. The brake cylinder according to claim 1, wherein the spring force accumulator piston is arranged between a service brake piston and an end wall of the brake cylinder housing that is provided with the compressed air connections.

13. The brake cylinder according to claim 12, further comprising:
    a piston-resetting spring operatively arranged on a side of the service brake piston facing away from the spring force accumulator piston.

14. The brake cylinder according to claim 1, further comprising at least two seals spaced apart from one another, the two seals being operatively arranged in a circumferential surface of the service brake piston.

15. The brake cylinder according to claim 1, further comprising a seal operatively arranged in a circumferential surface of the service brake piston.

16. The brake cylinder according to claim 1, further comprising a seal operatively arranged with respect to a piston rod of the service brake piston to seal the secondary space from the exterior of the brake cylinder housing.

* * * * *